United States Patent Office 3,296,232
Patented Jan. 3, 1967

3,296,232
COPOLYMERS OF 1-BUTENE AND 1-HEXENE
James W. Cleary, Bartlesville, Okla., assignor to Phillips Petroleum Company, a corporation of Delaware
No Drawing. Filed Mar. 29, 1963, Ser. No. 269,153
5 Claims. (Cl. 260—88.2)

This invention relates to a novel copolymer of 1-butene. In another aspect it relates to a film formed from a 1-butene copolymer and having exceptionally high resistance to tear.

Films formed from various olefin polymers such as polyethylene, polypropylene and the like have enjoyed wide commercial acceptance in the packaging field. Films from such olefin polymers are attractive because of their clarity, can be processed with relative ease and are inexpensive. They are also quite resistant to chemicals and have a low moisture vapor transmission which makes them highly suitable for packaging commodities which must be protected from their environment. Difficulties have been encountered, however, in the use of such materials in unsupported form in large bags such as would be used for chemicals, grain, farm produce, and the like. This difficulty stems from the fact that plastic films frequently fail when subjected to rough handling such as dropping, stacking, being lifted by the corners, etc. Increasing the thickness of the film in order to solve such problems diminishes the economic advantage these plastics would otherwise enjoy. Another approach involves blending various additives with the resin in order to improve its toughness. This, however, introduces an additional step and employs materials which are usually more expensive than the olefin polymer.

I have discovered that films of exceptional strength and resistance to tear can be fabricated from a copolymer of 1-butene with 1-hexene, said copolymer containing up to 6 weight percent of the 1-hexene comonomer and being highly stereoregular. These copolymers can be characterized as being at least 70 percent insoluble in normal hexane at room temperature and having a flexural modulus of at least 15,000 p.s.i. and a tensile strength of at least 3,000 p.s.i. Although 1-butene homopolymers having these physical properties can also be prepared, the copolymer can be made into film which has a tear resistance which is from 40 to 100 times greater than that of a similar film formed from the homopolymer.

It is an object of my invention to provide a novel copolymer which is highly suitable for the fabrication of film. Another object is to provide a film having exceptional toughness and tear resistance and thereby being valuable for the manufacture of heavy duty bags. Other objects, advantages and features of my invention will be apparent to those skilled in the art in the following discussion:

The copolymer can contain up to 6 weight percent of the comonomer although I prefer for best results that the amount of incorporated comonomer be limited to 5 weight percent. Ordinarily the copolymer contains at least 0.5 percent of the comonomer. The films which have evidenced the most outstanding properties with respect to toughness and tear resistance are made from copolymers of which at least 85 percent is insoluble in normal hexane at room temperature and which have a flexural modulus of at least 20,000 p.s.i. and a tensile strength of at least 3,000 p.s.i.

The copolymers of my invention can be made using known catalyst systems, particularly those which are known to polymerize propylene to a polymer having a high n-heptane-insoluble content. One highly suitable catalyst system for this purpose is formed from diethylaluminum chloride and titanium trichloride. Other catalyst systems which are highly stereospecific can be used for preparing the copolymer. In one such system the titanium trichloride is preferably a reaction product of titanium tetrachloride and aluminum. Generally the mol ratio of the diethylaluminum chloride to titanium trichloride is in the range of about 2 to 20 with the lower ratios being preferred for more consistently obtaining polymers having the desired properties. Elemental hydrogen can be used in the polymerization mixture. This tends to improve the processability and the tensile strength of the copolymer. The temperature of the polymerization is ordinarily in the range of 80 to 200° F. Operating at the lower temperature tends to provide polymers having higher flexural modulus and higher tensile strength. The proportion of the comonomer charged is ordinarily in the range of about 1 to 7 parts by weight per 100 parts of total monomer and is preferably about 1 to 5 parts by weight. An inert diluent, such as an aliphatic hydrocarbon, can be used or the polymerization can be conducted in the liquid monomer.

The film is made by conventional fabricating methods. Normally the blown tubing method is used. Such an operation is described in the U.S. Patent 2,952,874 of Robert Doyle. Modifications of this method which involve temperature conditioning and orientation of the polymer can also be used.

The high tensile strength, high flexural modulus and high regularity in the polymer molecular configuration, as indicated by its substantial insolubility in normal hexane, combine to produce a polymer which when formed into film will absorb impact rather than crack or tear. Also a heavily loaded package or bag formed from this film can be lifted by a corner or edge without appreciable deformation. The most surprising property of the film is its resistance to tear as measured by the Elmendorf tear test, this being many times greater than would be expected from the behavior of films formed from poly-1-butene which also exhibit good tensile strength and flexural modulus and are substantially insoluble in normal hexane.

To illustrate further the advantages of my invention the following example is presented. The materials, conditions and proportions in this example are to be construed as typical only and not to limit my invention unduly:

*Example*

A series of runs was made in which 1-butene was copolymerized with 1-hexene. The catalyst used was obtained by mixing diethylaluminum chloride and the reaction product of TiCl$_4$ and aluminum which can be designated as a complex having the formula

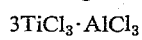

For each 100 grams of monomer charged, the amount of catalyst used was 0.362 gram of diethylaluminum chloride and 0.199 gram of the above-defined complex

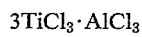

The catalyst components were charged to the reaction vessel after which the temperature was reduced to about 0° C. and the reactor sealed. Hydrogen and monomers were charged to the reactor and the temperature was raised to 30° C. where it was maintained for 5 hours with agitation. In all of the runs except Run 4, 20 millimoles of hydrogen were used per 100 grams of monomer. In Run 4, 16 millimoles of hydrogen were used per 100 grams of monomer. At the end of the polymerization the reaction mixture was quenched with methanol and the excess monomer was vented. The polymer was recovered, washed and dried and its physical properties were determined. The monomer charge ratios, the conversion for each run and the percent hexane insoluble in each polymer are shown in Table I. The physical properties of the copolymers are given in Table II.

TABLE I

| Run No. | 1-Butene (g.) | 1-Hexene (g.) | Conversion (Percent) | Hexane Insoluble (Percent) |
|---|---|---|---|---|
| 1 | 100 | 0 | 81 | 90.3 |
| 2 | 99 | 1 | 75 | 93.9 |
| 3 | 98 | 2 | 96 | (¹) |
| 4 | 97.5 | 2.5 | 95 | 95.8 |
| 5 | 97 | 3 | 94 | 92.3 |
| 6 | 96 | 4 | 96 | (¹) |
| 7 | 95 | 5 | 89 | 89.2 |

¹ Not determined.

TABLE II

| Run No. | Inherent Viscosity | Density (g./cc.) | Flexural Mod. (p.s.i.×10⁻³) | Tensile (p.s.i.) | Elongation (percent) | 100% Mod. (p.s.i.) |
|---|---|---|---|---|---|---|
| 1 | 1.83 | 0.9176 | 66 | 3,053 | 123 | 2,850 |
| 2 | 1.89 | 0.8932 | 41 | 3,810 | 260 | 1,997 |
| 3 | 1.67 | 0.8816 | 32 | 4,230 | 350 | 1,580 |
| 4 | 1.46 | 0.8733 | 26 | 3,770 | 330 | 1,263 |
| 5 | 1.86 | 0.8788 | 26 | 3,337 | 327 | 1,097 |
| 6 | 0.94 | 0.8799 | 24 | 3,753 | 397 | 1,037 |
| 7 | 2.05 | 0.8768 | 23 | 4,630 | 493 | 925 |

From the polymers described above as Runs 1 and 4, films were blown and evaluated. The conventional blown-tubing method of film fabrication was employed. The polymer of Run 1 was 1-butene homopolymer. The polymer of Run 4 was determined by infrared analysis to contain about 1.5 weight percent 1-hexene. Evaluation of these films are shown in Table III.

TABLE III

|  | Poly-1-Butene | Copolymer |
|---|---|---|
| Film Burst Strength, in | 62 | >72 |
| Film Tensile, p.s.i.: |  |  |
| Machine Direction | 3,850 | 5,994 |
| Transverse Direction | 3,992 | 6,092 |
| Film Elongation, Percent: |  |  |
| Machine Direction | 115 | 323 |
| Transverse Direction | 175 | 328 |
| Elmendorf Tear, g./mil: |  |  |
| Machine Direction | 42.1 | >1,600 |
| Transverse Direction | 16.3 | >1,600 |

The foregoing data show that a 98.5/1.5 1-butene/1-hexene copolymer when fabricated into film and compared with a film of 1-butene homopolymer shows an increase in Elmendorf tear of more than 3700 percent in the machine direction and of more than 9900 percent in transverse direction.

The following standard test methods were used to determine the properties indicated.

Property: ASTM designation
- Inherent viscosity — ¹ D-1601-16
- Density (g./cc. at 23° C.) — ² D-1505-60T
- Flexural modulus (73° F., p.s.i.) — D-790-61
- Tensile strength (73° F., p.s.i.) — ³ D-638-61T
- Elongation (73° F., percent) — ³ D-638-61T
- 100% modulus (73° F., p.s.i.) — ³ D-638-61T
- Film tensile (73° F., p.s.i.) — D-638-61T
- Film elongation (73° F., percent) — D-638-61T
- Elmendorf tear (g/ml.) — D-689-44

¹ Ostwald-Fenske viscometer was used and Tetralin was used as the solvent.
² The specimen is placed in thermal equilibrium for this determination. This can be done by compression molding the polymer at 340° F. until completely molten followed by cooling to 200° F. at a rate of about 10° F. per minute. The cooling is continued to 150° F. at a rate not exceeding 20° F. per minute. The polymer is then removed from the mold and cooled to room temperature.
³ Specimens are compression molded samples cut with a Type C die described in ASTM D-412-61T.

Film burst strength in inches is determined by dropping a 28.5-gram steel ball on a 2-inch diameter test specimen from increasing heights until the film fails. After establishing the height range at which failure is obtained, new specimens are used until failure is obtained by a single drop.

The fraction of the polymers which were insoluble in normal hexane is determined by weighing a sample of the polymer (2 to 4 grams) and shaking the sample in from 50 to 100 milliliters of normal hexane for one hour at room temperature. The liquid is then removed by siphoning and the extraction is repeated 3 times after which the polymer is washed with methanol, dried and weighed. From the loss in weight the percent of soluble and insoluble polymer can be calculated.

Copolymers formed from the same monomer charge but with a catalyst obtained by mixing titanium tetrachloride and triethylaluminum contained only about 40 to 50 weight percent material insoluble in normal hexane at room temperature. These polymers were too flexible to test for flexural modulus and had tensile strengths on the order of 400 to 500 p.s.i. Such polymers were not suitable for the fabrication of tough film. Copolymers of 1-butene and 1-hexene in the same ratio as in the above example and made using a catalyst obtained by mixing triethylaluminum and titanium trichloride prepared by reducing titanium tetrachloride with hydrogen contained a high amount of hexane insoluble material. These polymers, however, were either too low in flexural modulus or in tensile strength and the 100 percent modulus values were consistently below the copolymers of Table II. These polymers also were unsuitable for the manufacture of film having high toughness and tear resistance as made from the polymers of my invention. It is demonstrated, therefore, that this invention provides a copolymer having a unique balance of physical properties which make the copolymer exceptionally well suited for the manufacture of heavy duty film.

As will be apparent to those skilled in the art, various modifications can be made in my invention without departing from the spirit or scope thereof.

I claim:

1. A copolymer formed by contacting under polymerization conditions a monomeric mixture of 93 to 99 parts by weight of 1-butene and 1 to 7 parts of 1-hexene with an organo aluminum-reduced titanium chloride catalyst, said copolymer having a flexural modulus of at least 15,000 p.s.i. and a tensil strength of at least 3000 p.s.i. and being at least 70 percent insoluble in normal hexane at room temperature.

2. The copolymer of claim 1 wherein said catalyst is one which forms on mixing diethylaluminum chloride and a reaction product of titanium tetrachloride and aluminum.

3. The copolymer of claim 1 wherein said monomeric mixture is 95 to 99 parts of 1-butene and 1 to 5 parts of 1-hexene, said copolymer having a flexural modulus of at least 20,000 p.s.i. and a tensile strength of at least 3000 p.s.i. and being at least 85 percent insoluble in normal hexane at room temperature.

4. As an article of manufacture a film formed from the copolymer of claim 1.

5. As an article of manufacture a film formed from the copolymer of claim 2.

References Cited by the Examiner

UNITED STATES PATENTS

| 3,010,952 | 11/1961 | Lovett et al. | 260—88.2 |
| 3,093,624 | 6/1963 | Gresham et al. | 260—88.2 |
| 3,197,452 | 7/1965 | Natta et al. | 260—88.2 X |

OTHER REFERENCES

Gaylor and Mark: Linear and Stereoregular Additional Polymers Interscience Publishers, Inc. New York (1959), p. 214.

JOSEPH L. SCHOFER, *Primary Examiner.*

E. M. OLSTEIN, L. EDELMAN, *Assistant Examiners.*

UNITED STATES PATENT OFFICE
CERTIFICATE OF CORRECTION

Patent No. 3,296,232                                                    January 3, 1967

James W. Cleary

It is hereby certified that error appears in the above numbered patent requiring correction and that the said Letters Patent should read as corrected below.

Column 4, line 52, for the claim reference numeral "1" read -- 2 --.

Signed and sealed this 24th day of October 1967.

(SEAL)
Attest:

Edward M. Fletcher, Jr.                                    EDWARD J. BRENNER
Attesting Officer                                                Commissioner of Patents